(12) United States Patent
Higgins

(10) Patent No.: US 7,216,453 B1
(45) Date of Patent: May 15, 2007

(54) FISHING POLE HOLDER

(76) Inventor: Wilbur S. Higgins, P.O. Box 301, North Waterboro, ME (US) 04061

( * ) Notice: Subject to any disclaimer, the term of this patent is extended or adjusted under 35 U.S.C. 154(b) by 0 days.

(21) Appl. No.: 11/255,351

(22) Filed: Oct. 20, 2005

(51) Int. Cl.
*A01K 97/10* (2006.01)
(52) U.S. Cl. ............................................ 43/21.2
(58) Field of Classification Search ............... 43/21.2; 248/529, 530, 532, 533
See application file for complete search history.

(56) References Cited

U.S. PATENT DOCUMENTS

| 358,527 | A | | 3/1887 | Zwoyer et al. | |
|---|---|---|---|---|---|
| 806,402 | A | * | 12/1905 | Donnelly | 248/523 |
| 1,952,789 | A | * | 3/1934 | Butts | 248/533 |
| 2,127,790 | A | | 8/1938 | Gayden | |
| 2,833,500 | A | * | 5/1958 | Jones | 43/21.2 |
| 3,339,869 | A | * | 9/1967 | Andersen | 248/532 |
| 3,603,019 | A | | 9/1971 | Smeltzer | |
| 4,293,113 | A | | 10/1981 | Gray | |
| 4,372,072 | A | | 2/1983 | Comeau | |
| 4,677,784 | A | | 7/1987 | Butkus | |
| 4,793,086 | A | | 12/1988 | Cup | |
| 5,044,597 | A | * | 9/1991 | Walczak | 248/530 |
| 5,046,279 | A | | 9/1991 | Smith et al. | |
| 5,131,179 | A | | 7/1992 | McEwen | |
| 5,349,775 | A | | 9/1994 | Mondares | |
| 6,216,998 | B1 | | 4/2001 | Butrymowicz et al. | |
| 6,338,465 | B1 | | 1/2002 | Stoner | |

* cited by examiner

*Primary Examiner*—Kurt Rowan

(57) ABSTRACT

Two V-shaped fishing rod support elements are telescopingly coupled together and each element has a tubular element fastened thereto. Each support element has a pointed end which is forced into the ground to support a fishing rod once the two elements have been separated from each other.

1 Claim, 1 Drawing Sheet

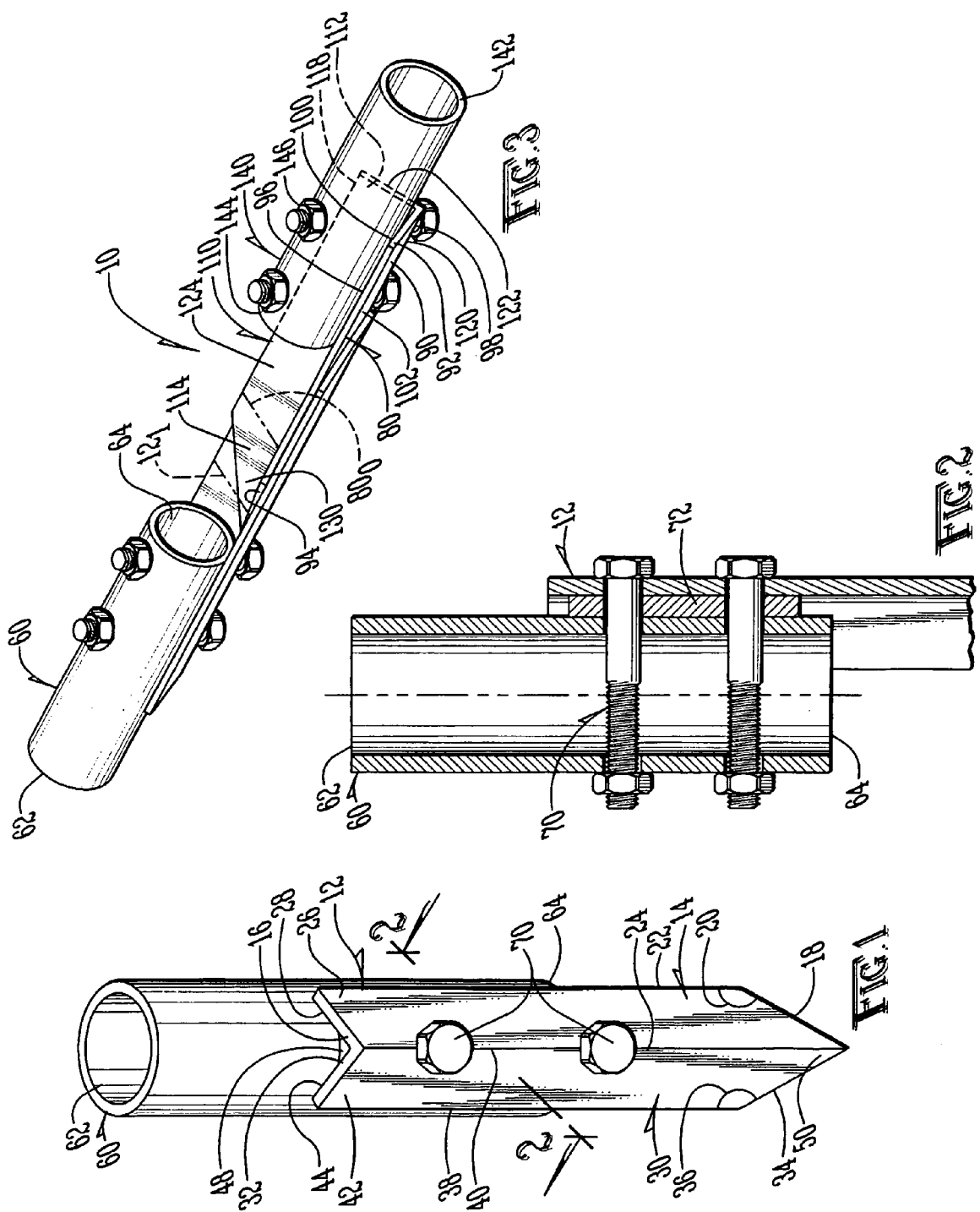

FISHING POLE HOLDER

BACKGROUND OF THE INVENTION

1. Field of the Invention

The present invention relates generally to devices for fishing and more particularly to fishing rod holders.

2. Background of the Invention

Fishing dates back at least 10,000 years, as man has sought fish for sustenance and sport from at least that time. Often using a fishing rod, or in many instances attempting to maximize his harvest of fish, for food, or sport, or just to lie back and relax, until a fish or fish bite, man has attempted to devise means for holding his fishing rod or rods, while waiting for the excitement to begin.

Because fishing often entails prolonged holding of a fishing rod, often for many hours, a number of devices have been developed for supporting the fishing rod for the fisherman. One desirable feature of such devices is that they offer adjustability in the positioning of the rod. Also, because some fishermen prefer to fish with more than one rod at a given time, it is desirable that the fishing rod support device be capable of supporting a plurality of fishing rods simultaneously.

While the art contains many examples of devices intended to support a fishing rod, these devices are not as efficient as possible since they generally are not amenable to efficiently carrying one or more fishing rods. Therefore, a fisherman is required to carry several items, which may be inconvenient.

For example, some fishing rod holders have an open top cylinder with a spike coaxially aligned with the cylinder and removably or fixedly attached to the closed end of the cylinder. One uses the holder by inserting the sharp end of the spike into a substrate, such as the bank of a river, and then inserting the handle end of a fishing rod, or pole, into the cylinder for support of the fishing rod at an angle with respect to the substrate.

One disadvantage of the type of holder with a fixed spike is that sharp end of the spike is exposed when the holder is not in use and presents a safety hazard. The type of holder with a removable spike suffers from the same disadvantage but, in addition, has the further disadvantage that the spike may become separated from the cylinder and lost when the holder is not in use. Yet another disadvantage with these holders is their inability to assist a fisherman in carrying the fishing rod.

In order to satisfy the needs of most fishermen, there is a need for a simple, effective, lightweight, durable, fishing rod holder for quick and easy access, installation, and removal of at least one and a plurality of fishing rods thereon and therefrom, respectively, and requiring no assembly or minimal assembly. The fishing rod holder should be inexpensive, attractive, quick and easy to install and remove from a surface, and compactly storable. The fishing rod holder should be capable of being removably engaged into the ground.

Different fish rod holder and supports have heretofore been known. However, none of the fishing rod holder or supports adequately satisfies these aforementioned needs.

INVENTION SUMMARY

The present invention is generally directed to a fishing rod holder having two portions, where each portion includes a V-shaped support element with a tubular element fixed thereto. Each V-shaped support element includes a pointed end and one of the V-shaped support elements is slightly smaller than the other V-shaped support element so the smaller element can be telescopingly accommodated in the larger element to couple the two support elements together. The two V-shaped support element can also be the same size. A spacer element is interposed between one of the tubular elements and the V-shaped fishing rod support element associated therewith. The spacer can also be made of same material as the V-shaped support elements for ease of sliding together.

Using the fishing rod holder embodying the present invention will permit a fisherman to carry two fishing rods at one time. The carrying units can then be used to support the fishing rods so the holder embodying the present invention achieves multiple goals. The carrying units can also fit over the handle of tackle boxes for multiple carrying.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of one portion of the fishing rod holder embodying the present invention.

FIG. 2 is a sectional view taken along line 2—2 of FIG. 1.

FIG. 3 is a perspective view of an assembled fishing rod holder embodying the present invention.

DETAILED DESCRIPTION OF THE INVENTION

Referring to the figures, it can be understood that the present invention is embodied in a fishing rod holder unit 10 which permits a fisherman to easily carry two fishing rods and then will act as supports for those fishing rods whereby unit 10 is a dual purpose unit.

Unit 10 comprises a first V-shaped fishing rod support element 12 which includes a first planar section 14 with a first end 16 and a second end 18. Second end 18 is oriented at an oblique angle 20 with respect to first end 16. Section 14 further includes a first side edge 22, a second side edge 24, a first surface 26 and a second surface 28. Second surface 26 will be identified as being an inner surface for the sake of discussion.

Element 12 further includes a second planar section 30 with a first end 32 and a second end 34. Second end 34 is oriented at an oblique angle 36 with respect to first end 32. Section 30 further includes a first side edge 38, a second side edge 40, a first surface 42 and a second surface 44, with second surface 44 being referred to as an inner surface for the sake of discussion.

Second side edge 24 of first planar section 14 is integrally connected to second side edge 40 of second planar section 30. First planar section 14 is oriented at an oblique angle 48 with respect to second planar section 14 to form a V-shape.

First end 16 of first planar section 14 is co-linear with first end 32 of second planar section 30.

The second ends of the first and second planar sections are oriented with respect to each other to define a pointed end 50 of first V-shaped fishing rod support element 12. Pointed end 50 will be forced into the ground to define a fishing rod support. First V-shaped fishing rod support element 12 has an internal dimension 12$_I$ measured between the first side edges of the first and second planar sections on the inner surfaces of the planar sections.

A first tubular section 60 has a first end 62 and a second end 64. First end 62 is spaced apart from the first ends of the first and second planar sections of first V-shaped fishing rod support element 12, and second end 64 of first tubular section 60 is located between the first and second ends of the first and second planar sections of first V-shaped fishing rod support element 12.

Two fastener elements, such as bolt 70, fasten first tubular section 60 to first V-shaped fishing rod support element 12. A spacer element 72 is interposed between first tubular section 60 and first V-shaped fishing rod support element 12. A fishing rod is accommodated in tubular section 60 and is mounted on support element 12 via the tubular section, with the spacer element locating the fishing rod a preset distance from the inner surfaces of the support element whereby the fishing rod will be easily carried by unit 10 when a second fishing rod is also being carried by unit 10 as will be understood from the teaching of this disclosure.

Unit 10 further comprises a second V-shaped fishing rod support element 80 which includes a first planar section 90 with a first end 92 and a second end 94. Second end 94 is oriented at an oblique angle with respect to first end 92 in a manner similar to the above-discussed angle 20. Section 90 further includes a first side edge 96, a second side edge 98, a first surface 100 and a second surface 102.

Element 80 further includes a second planar section 110 with a first end 112 and a second end 114. Second end 114 is oriented at an oblique angle with respect to first end 112 in a manner similar to the above-discussed angle 36. Planar section 110 further includes a first side edge 118, a second side edge 120, a first surface 122 and a second surface 124.

Second side edge 120 is integrally connected to second side edge 98 in a manner similar to the above-discussed connection between edges 24 and 40 of element 12. As with element 12, first planar section 90 of the second V-shaped fishing rod support element is oriented at an oblique angle with respect to second planar section 110 of the second V-shaped fishing rod support element to define a V-shape.

First end 92 of the first planar section of second V-shaped fishing rod support element 80 is co-linear with first end 112 of the second planar section of the second V-shaped fishing rod support element. The second ends of the first and second planar sections of second V-shaped fishing rod support element 80 are oriented with respect to each other to define a pointed end 130 of said second V-shaped fishing rod support element which will be forced into the ground to support a fishing rod as discussed above with respect to element 12.

Second V-shaped fishing rod support element 80 has an external dimension 80$_O$ measured between the first side edges of the first and second planar sections of second V-shaped fishing rod support element 80. External dimension 80$_O$ of second V-shaped fishing rod support element 80 is smaller than internal dimension 12$_I$ of first V-shaped fishing rod support element 12 so second V-shaped fishing rod support element 80 can be telescopingly accommodated in first V-shaped fishing rod support element 12 as shown in FIG. 3.

A second tubular section 140 has a first end 142 and a second end 144. First end 142 is spaced apart from the first ends of the first and second planar sections of second V-shaped fishing rod support element 80, and second end 144 is located between the first and second ends of the first and second planar sections of second V-shaped fishing rod support element 80.

Two fastener elements, such as bolt 146, fasten second tubular section 140 to second V-shaped fishing rod support element 80. In use, a fisherman places a fishing rod in each of the two tubular support sections 60 and 140 and then telescopingly couples elements 12 and 80 together as indicated in FIG. 3. The two rods will be essentially colinear with each other due to the presence of spacer element 72 even though one V-shaped support element is located inside the other support element. When the fisherman desires to fish, he simply separates the support elements and forces the pointed end of each element into the ground. The two rods will be supported by the same elements that were used to store and carry them. Once fishing is completed, the fisherman simply reattaches the two support elements together into the FIG. 3 configuration and carries the rods as a single package.

While various embodiments of the invention have been described, it will be apparent to those of ordinary skill in the art that many more embodiments and implementations are possible within the scope of this invention. For example, the fishing rod support element may have a semi-circular configuration rather than a V-shape, as discussed above. Accordingly, the invention is not to be restricted except in light of the attached claims and their equivalents.

The invention claimed is:

1. A fishing rod holder unit comprising:
  A) a first V-shaped fishing rod support element which includes
    (1) a first planar section with a first end and a second end, the second end of the first planar section being oriented at an oblique angle with respect to the first end of the first planar section, a first side edge, a second side edge, a first surface and a second surface,
    (2) a second planar section with a first end and a second end, the second end of the second planar section being oriented at an oblique angle with respect to the first end of the second planar section, a first side edge, a second side edge, a first surface and a second surface,
    (3) the second side edge of the first planar section being integrally connected to the second side edge of the second planar section,
    (4) the first planar section being oriented at an oblique angle with respect to the second planar section,
    (5) the first end of the first planar section being co-linear with the first end of the second planar section,
    (6) the second ends of the first and second planar sections being oriented with respect to each other to define a pointed end of said first V-shaped fishing rod support element, and
    (7) said first V-shaped fishing rod support element having an internal dimension measured between the first side edges of the first and second planar sections;
  B) a first tubular section having a first end and a second end, the first end of the tubular section being spaced apart from the first ends of the first and second planar sections of said first V-shaped fishing rod support element, and the second end of said first tubular section being located between the first and second ends of the first and second planar sections of said first V-shaped fishing rod support element;

C) a fastener element fastening said first tubular section to said first V-shaped fishing rod support element;

D) a spacer element interposed between said first tubular section and said first V-shaped fishing rod support element;

E) a second V-shaped fishing rod support element which includes
   (1) a first planar section with a first end and a second end, the second end of the first planar section of said second V-shaped fishing rod support element being oriented at an oblique angle with respect to the first end of the first planar section of said second V-shaped fishing rod support element, a first side edge, a second side edge, a first surface and a second surface,
   (2) a second planar section with a first end and a second end, the second end of the second planar section of said second V-shaped fishing rod support element being oriented at an oblique angle with respect to the first end of the second planar section of said second V-shaped fishing rod support element, a first side edge, a second side edge, a first surface and a second surface,
   (3) the second side edge of the first planar section of said second V-shaped fishing rod support element being integrally connected to the second side edge of the second planar section of said second V-shaped fishing rod support element,
   (4) the first planar section of said second V-shaped fishing rod support element being oriented at an oblique angle with respect to the second planar section of said second V-shaped fishing rod support element,
   (5) the first end of the first planar section of said second V-shaped fishing rod support element being co-linear with the first end of the second planar section of said second V-shaped fishing rod support element,
   (6) the second ends of the first and second planar sections of said second V-shaped fishing rod support element being oriented with respect to each other to define a pointed end of said second V-shaped fishing rod support element, and
   (7) said second V-shaped fishing rod support element having an external dimension measured between the first side edges of the first and second planar sections of said second V-shaped fishing rod support element, with the external dimension of said second V-shaped fishing rod support element being smaller than the internal dimension of said first V-shaped fishing rod support element so said second V-shaped fishing rod support element can be telescopingly accommodated in said first V-shaped fishing rod support element;

F) a second tubular section having a first end and a second end, the first end of said second tubular section being spaced apart from the first ends of the first and second planar sections of said second V-shaped fishing rod support element, and the second end of said second tubular section being located between the first and second ends of the first and second planar sections of said second V-shaped fishing rod support element; and G) a fastener element fastening said second tubular section to said second V-shaped fishing rod support element.

* * * * *